United States Patent [19]

Egashira et al.

[11] Patent Number: 5,605,967
[45] Date of Patent: Feb. 25, 1997

[54] GOLF BALL

[75] Inventors: Yoshinori Egashira; Yasushi Ichikawa; Hideo Watanabe, all of Chichibu, Japan

[73] Assignee: Bridgestone Sports Co., Ltd., Tokyo, Japan

[21] Appl. No.: 424,181

[22] Filed: Apr. 19, 1995

[30] Foreign Application Priority Data

Apr. 22, 1994 [JP] Japan ..................... 6-107710

[51] Int. Cl.⁶ ............... A63B 37/12; C08L 23/26; C08L 33/02
[52] U.S. Cl. .............. 525/221; 525/196; 473/385; 273/DIG. 22
[58] Field of Search ................ 525/221, 196; 273/235 R; 473/385

[56] References Cited

U.S. PATENT DOCUMENTS 4,984,804  1/1991  Yamada et al. .
5,068,151  11/1991  Nakamura .

FOREIGN PATENT DOCUMENTS 0443706  8/1991  European Pat. Off. .
2267908  12/1993  United Kingdom .

*Primary Examiner*—Carman J. Secouro, Jr.
*Attorney, Agent, or Firm*—Sughrue, Mion, Zinn, Macpeak & Seas

[57] ABSTRACT

In a golf ball comprising a cover enclosing a core, the cover is formed of a resin blend of (a) a potassium ionomer resin and (b) a magnesium ionomer resin. Both the ionomer resins are ethylene-α, β-unsaturated carboxylic acid copolymers containing 10 to 20% by weight of α, β-unsaturated carboxylic acid, 20 to 70 mol % of the carboxyl group being neutralized with potassium or magnesium ion. The ionomer resins have a melt index of 0.6 to 8 and a Shore D hardness of 55 to 70. Ionomer resins (a) and (b) are blended in a weight ratio of from 85:15 to 20:80. The cover has enhanced durability against hitting at no expense of repulsion upon hitting.

1 Claim, No Drawings

GOLF BALL

TECHNICAL FIELD

This invention relates to golf balls including solid golf balls and thread wound golf balls.

BACKGROUND

In golf balls having a core enclosed in a cover, ionic ethylene copolymers known as ionomer resins have been widely used as the cover material because of their high rebound, impact resistance, cut resistance and ball flying performance. Use of ionomer resins as the cover material is the mainstream in the current golf ball manufacture.

Ionomer resins are generally available in the form of ethylene-metal unsaturated carboxylate-unsaturated carboxylic acid copolymers and such copolymers further containing an unsaturated carboxylic acid ester. Well-known ionomer resins are those wherein the metal salts of unsaturated carboxylic acids are salts of monobasic unsaturated carboxylic acids such as acrylic acid and methacrylic acid and dibasic unsaturated carboxylic acids such as maleic acid and fumaric acid with monovalent metals such as sodium and potassium and divalent metals such aszinc and magnesium. The ionomer resins most often used as the cover material of golf balls are those wherein the metals are sodium and zinc, that is, sodium ion neutralized type, zinc ion neutralized type and a mixture thereof.

Although golf balls using such ionomer resins as the cover have excellent characteristics as mentioned above, they still have some room to improve their durability against hitting. In accordance with the recent tendency of golf balls toward softer feeling, especially the widespread use of golf balls having a soft core, there is a need for a golf ball having the soft core enclosed in a cover having good hitting durability that few cracks occur after repeated shots.

An object of the invention is to provide a golf ball meeting such a requirement.

SUMMARY OF THE INVENTION

Therefore, the present invention is directed to a golf ball comprising a core and a cover enclosing the core. The cover is formed of a resin composition containing a resin component consisting of (a) a potassium ionomer resin and (b) a magnesium ionomer resin. The potassium ionomer resin (a) is an ethylene-$\alpha$, $\beta$-unsaturated carboxylic acid copolymer containing 10 to 20% by weight of $\alpha$, $\beta$-unsaturated carboxylic acid. 20 to 70 mol % of the carboxyl group is neutralized with potassium ion. The potassium ionomer resin has a melt index of 0.6 to 8 and a Shore D hardness of 55 to 70. The magnesium ionomer resin (b) is an ethylene-$\alpha$, $\beta$-unsaturated carboxylic acid copolymer containing 10 to 20% by weight of $\alpha$, $\beta$-unsaturated carboxylic acid. 20 to 70 mol % of the carboxyl group is neutralized with magnesium ion. The magnesium ionomer resin has a melt index of 0.6 to 8 and a Shore D hardness of 55 to 70. Components (a) and (b) are blended in a weight ratio of from 85:15 to 20:80. This cover composition has high impact strength and has enhanced durability against hitting at no expense of repulsion upon hitting. Then the cover can be reduced in thickness. Particularly when combined with a soft core, such a thinner cover allows the ball to take full advantage of the soft core while maintaining the above-mentioned properties inherent to the ionomer resin.

BEST MODE FOR CARRYING OUT THE INVENTION

In the golf ball of the present invention, a blend of ionomer resins is used as the resin component of which the cover is made. More specifically, the resin component consists of (a) a potassium ionomer resin in the form of an ethylene-$\alpha$, $\beta$-unsaturated carboxylic acid copolymer containing 10 to 20% by weight of $\alpha$, $\beta$-unsaturated carboxylic acid, 20 to 70 mol % of the carboxyl group being neutralized with potassium ion, and (b) a magnesium ionomer resin in the form of an ethylene-$\alpha$, $\beta$-unsaturated carboxylic acid copolymer containing 10 to 20% by weight of $\alpha$, $\beta$-unsaturated carboxylic acid, 20 to 70 mol % of the carboxyl group being neutralized with magnesium ion.

The $\alpha$, $\beta$-unsaturated carboxylic acid used herein includes acrylic acid, methacrylic acid, maleic acid, and fumaric acid. Methacrylic acid and acrylic acid are especially preferred.

The content of $\alpha$, $\beta$-unsaturated carboxylic acid in the ionomer resin is 10 to 20% by weight in either of ionomer resins (a) and (b). Ionomer resins with less than 10% by weight of $\alpha$, $\beta$-unsaturated carboxylic acid are less stiff and less repulsive whereas ionomer resins with more than 20% by weight of $\alpha$, $\beta$-unsaturated carboxylic acid are too stiff and brittle to meet the object of the invention.

The ethylene-$\alpha$, $\beta$-unsaturated carboxylic acid copolymer as either of ionomer resins (a) and (b) has carboxyl groups. It is essential that 20 to 70 mol %, preferably 25 to 60 mol % of the carboxyl group be neutralized with potassium or magnesium ion. Ionomer resins with less than 20 mol % of neutralization are short of stiffness and repulsion whereas ionomer resins with more than 70 mol % of neutralization are increased in stiffness to exacerbate feeling, suffer from a loss of flow in molding, and are less impact resistant.

Both the potassium and magnesium ionomer resins (a) and (b) should have a melt index (MI) of 0.6 to 8, preferably 0.7 to 3. With MI of less than 0.6, resins are less flowing and inefficient to mold. An MI of more than 8 leads to a loss of rebound.

Both the potassium and magnesium ionomer resins (a) and (b) should have a Shore D hardness of 55 to 70. A shore D hardness of less than 55 leads to a loss of repulsion whereas a Shore D hardness of more than 70 exacerbates hitting feel and impact resistance.

According to the invention, the potassium and magnesium ionomer resins (a) and (b) are blended in a weight ratio (a)/(b) of from 85:15 to 20:80, preferably from 75:25 to 35:65. Contents of component (a) beyond this range failto provide satisfactory hitting durability. With contents of component (a) below this range, hitting durability and repulsion become poor.

The ionomer resins (a) and (b) are generally mixed using an extruder. The extruder used herein may be a single screw type although it is preferred to melt blend the resins through a twin-screw extruder.

The resin composition of which the cover is formed contains the resin component consisting of potassium and magnesium ionomer resins as a major component. If desired, the composition further contains various additives, for example, pigments (e.g., titanium dioxide), anti-oxidants, UV absorbers, and polymeric stabilizers in conventional amounts.

The core to be enclosed in the cover may be for solid golf balls or wound golf balls. The cover according to the invention is more effective when combined with solid golf ball cores. The cores for solid golf balls, that is, solid cores include cores for two-piece golf balls and cores for multiple solid golf balls (typically three-piece golf balls). Any of solid cores prepared from well-known compositions by well-known techniques may be used. Since the cover according to the invention is especially effective for soft cores, solid cores having such a hardness as to yield a distortion of 2.6 to 4.0 mm under a load of 100 kg are preferred.

The cores for wound golf balls, that is, wound cores are comprised of a center having thread rubber wound thereon. The center may be either a liquid center or a solid center. Any of wound cores prepared from well-known compositions by well-known techniques may be used.

For the same reason as above, wound cores having such a hardness as to yield a distortion of 2.6 to 4.0 mm under a load of 100 kg are preferred.

In forming the cover on the core, any conventional molding technique such as injection molding and compression molding may be used.

The golf ball of the invention is prepared to the size and weight according to the golf ball rules. The cover may have a (radial) thickness of 1.2 to 2.5 mm. In order that the characteristics of a soft core be advantageously exerted, the cover can be as thin as about 1.3 to 2.2 mm according to the invention. With such a thin cover, no problem arises because of high hitting durability.

EXAMPLE

Examples of the present invention are given below by way of illustration and not by way of limitation.

EXAMPLES 1–6 AND COMPARATIVE EXAMPLES 1–8

For the manufacture of two-piece golf balls, a solid core having a diameter of 38.5 mm was prepared by milling a rubber composition of the following formulation and effecting vulcanization at 155° C. for 20 minutes. This core had such a hardness as represented by a distortion of 3.3 mm under a load of 100 kg.

| Rubber composition (Core) | Parts by weight |
| --- | --- |
| Polybutadiene rubber (BR01 BY Japan Synthetic Rubber Co., Ltd.) | 100 |
| Zinc acrylate | 27 |
| Zinc oxide | 10 |
| Barium Sulfate | 12.5 |
| Dicumyl peroxide | 0.9 |

Next, a cover composition was prepared by milling 100 parts by weight of a resin component of ionomer resins blended as shown in Table 1 with 5 parts by weight of titanium dioxide and 0.3 part by weight of magnesium stearate in a twin-screw extruder. The cover composition was injection molded over the solid core to form a cover of 2.1 mm thick thereon.

The resulting golf balls were examined by the following tests.

(1) Cover Rebound

Measurement was made according to JIS K-6301.

(2) Ball Hardness

Hardness is expressed by a distortion (mm) of a ball under a load of 100 kg. Higher values indicate softer balls.

(3) Initial Speed

Using a swing machine by True Temper Co., a ball was hit with a driver at a head speed of 45 m/s to measure an initial speed (m/s).

(4) Hitting Durability

Using a swing machine by True Temper Co., a ball was hit 200 times with a driver at a head speed of 45 m/s. The number of cracks was counted. The results are reported in Table 1 as an index based on 100 for Comparative Example 7. Each example used 20 samples.

The results are shown in Table 1.

| | Example | | | | | | Comparative Example | | | | | | | |
| --- | --- | --- | --- | --- | --- | --- | --- | --- | --- | --- | --- | --- | --- | --- |
| | 1 | 2 | 3 | 4 | 5 | 6 | 1 | 2 | 3 | 4 | 5 | 6 | 7 | 8 |
| Cover composition | | | | | | | | | | | | | | |
| K ion type ionomer | | | | | | | | | | | | | | |
| Resin (1) | 80 | 50 | 30 | 50 | — | — | 100 | — | — | — | — | — | — | 50 |
| Resin (2) | — | — | — | — | 50 | 50 | — | 100 | — | — | — | — | — | — |
| Mg ion type ionomer | | | | | | | | | | | | | | |
| Resin (3) | 20 | 50 | 70 | — | 50 | — | — | — | 100 | — | — | — | — | — |
| Resin (4) | — | — | — | 50 | — | 50 | — | — | — | 100 | — | — | — | — |
| Na ion type ionomer (Himilan 1605) | — | — | — | — | — | — | — | — | — | — | 100 | — | 50 | — |
| Zn ion type ionomer (Himilan 1706) | — | — | — | — | — | — | — | — | — | — | — | 100 | 50 | 50 |
| Cover physical properties | | | | | | | | | | | | | | |
| Hardness (Shore D) | 63 | 62 | 62 | 62 | 62 | 62 | 62 | 60 | 62 | 63 | 62 | 61 | 63 | 62 |
| Rebound (%) | 66 | 66 | 65 | 65 | 64 | 64 | 66 | 65 | 64 | 64 | 63 | 61 | 66 | 65 |
| Ball properties | | | | | | | | | | | | | | |
| Hardness (mm) | 2.81 | 2.82 | 2.84 | 2.83 | 2.80 | 2.81 | 2.84 | 2.89 | 2.86 | 2.84 | 2.88 | 2.93 | 2.80 | 2.82 |
| Initial speed (m/s) | 66.1 | 66.2 | 66.0 | 66.2 | 66.1 | 66.1 | 65.8 | 65.7 | 65.4 | 65.3 | 65.8 | 65.2 | 66.1 | 66.1 |
| Hitting durability | 111 | 110 | 109 | 114 | 114 | 116 | 97 | 98 | 70 | 75 | 92 | 70 | 100 | 101 |

Resin (1)
　Ethylene-methacrylic acid copolymer ionomer
　　Methacrylic acid content: about 15 wt %
　　Ion species: potassium
　　Degree of ionization: about 30 mol %
　　M.I.: 2.8
　　Hardness (Shore D): 62
Resin (2)
　Ethylene-methacrylic acid copolymer ionomer
　　Methacrylic acid content: about 15 wt %
　　Ion species: potassium
　　Degree of ionization: about 60 mol %
　　M.I.: 1.0
　　Hardness (Shore D): 60
Resin (3)
　Ethylene-methacrylic acid copolymer ionomer
　　Methacrylic acid content: about 15 wt %
　　Ion species: magnesium
　　Degree of ionization: about 55 mol %
　　M.I.: 0.7
　　Hardness (Shore D): 62
Resin (4)
　Ethylene-methacrylic acid copolymer ionomer
　　Methacrylic acid content: about 15 wt %
　　Ion species: magnesium
　　Degree of ionization: about 30 mol %
　　M.I.: 6.5
　　Hardness (Shore D): 63
Himilan 1605
　Ethylene-methacrylic acid copolymer ionomer
　　Methacrylic acid content: about 15wt %
　　Ion species: sodium
　　Degree of ionization: about 30 mol %
　　M.I.: 2.8
　　Hardness (Shore D): 62
Himilan 1706
　Ethylene-methacrylic acid copolymer ionomer
　　Methacrylic acid content: about 15 wt %
　　Ion species: zinc
　　Degree of ionization: about 60 mol %
　　M.I.: 0.9
　　Hardness (Shore D): 61

There has been described a golf ball having a cover composed of a resin component in the form of a blend of a potassium ionomer resin and a magnesium ionomer resin. The durability of the ball against hitting is improved without detracting from repulsion upon hitting.

Japanese Patent Application No. 107710/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A golf ball comprising a core and a cover enclosing the core, said cover being formed of a resin composition containing a resin component consisting of (a) a potassium ionomer resin in the form of an ethylene-α, β-unsaturated carboxylic acid copolymer containing 10 to 15% by weight of α, β-unsaturated carboxylic acid, 20 to 70 mol % of the carboxyl group being neutralized with potassium ion, said potassium ionomer resin having a melt index of 0.6 to 8 and a Shore D hardness of 55 to 70, and (b) a magnesium ionomer resin in the form of an ethylene-α, β-unsaturated carboxylic acid copolymer containing 10 to 15% by weight of α, β-unsaturated carboxylic acid, 20 to 70 mol % of the carboxyl group being neutralized with magnesium ion, said magnesium ionomer resin having a melt index of 0.6 to 8 and a Shore D hardness of 55 to 70, components (a) and (b) being blended in a weight ratio of from 85:15 to 20:80.

* * * * *